United States Patent
Turk (10) Patent No.: US 8,265,616 B2
(45) Date of Patent: Sep. 11, 2012

(54) SYSTEM AND METHOD FOR TRAFFIC ROUTING

(75) Inventor: Doughan A. Turk, Mississauga (CA)

(73) Assignee: BCE Inc., Verdun (CA)

( * ) Notice: Subject to any disclaimer, the term of this patent is extended or adjusted under 35 U.S.C. 154(b) by 783 days.

(21) Appl. No.: 12/314,171

(22) Filed: Dec. 5, 2008

(65) Prior Publication Data

US 2009/0161615 A1 Jun. 25, 2009

Related U.S. Application Data

(63) Continuation of application No. 11/311,480, filed on Dec. 20, 2005, now abandoned.

(51) Int. Cl.
H04M 3/00 (2006.01)

(52) U.S. Cl. .......... 455/418; 455/426.1; 455/445; 709/226

(58) Field of Classification Search .......... 455/418, 455/426.1, 445; 709/250, 226
See application file for complete search history.

(56) References Cited

U.S. PATENT DOCUMENTS

| | | |
|---|---|---|
| 6,427,174 B1 | 7/2002 | Sitaraman et al. |
| 6,539,431 B1 | 3/2003 | Sitaraman et al. |
| 7,020,739 B2 | 3/2006 | Mukaida et al. |
| 7,051,089 B1 | 5/2006 | Johnson et al. |
| 7,080,129 B2 | 7/2006 | Cummings et al. |
| 7,165,122 B1 * | 1/2007 | Sitaraman et al. ............ 709/250 |
| 2002/0016831 A1 | 2/2002 | Peled et al. |
| 2002/0087725 A1 | 7/2002 | Cummings et al. |
| 2003/0076805 A1 * | 4/2003 | Agrawal et al. ............... 370/338 |
| 2003/0079017 A1 * | 4/2003 | Agrawal et al. ............... 709/226 |
| 2003/0133450 A1 | 7/2003 | Baum |
| 2003/0177211 A1 | 9/2003 | Cyr et al. |
| 2004/0192298 A1 | 9/2004 | Farley et al. |

FOREIGN PATENT DOCUMENTS

WO WO 02/096041 11/2002

OTHER PUBLICATIONS

Office Action mailed on Apr. 14, 2008 in connection with U.S. Appl. No. 11/311,480.
Office Action mailed on Sep. 5, 2008 in connection with U.S. Appl. No. 11/311,480.
Juniper Networks Steel-Belted Radius/Service Provider Edition, Radius/AAA Carrier and ISP Solutions, http://www.juniper.net/products/aaa/sbr/, Copyright 1998-2006, 2 pages.
Office Action issued by the Canadian Intellectual Property Office on Oct. 30, 2008 in connection with corresponding Canadian Patent Application No. 2,491,161.
Office Action issued by Canadian Intellectual Property Office on Sep. 1, 2011 in connection with corresponding Canadian Patent Application No. 2,491,161.

* cited by examiner

*Primary Examiner* — Danh Le
(74) *Attorney, Agent, or Firm* — Murray IP Consulting Inc.; Sean Murray (57) ABSTRACT

The present invention provides a system and method for traffic routing. An embodiment includes an engine for identifying groupings of subscriber stations within a particular ISP. The engine can also obtain a block of contiguous addresses for assignment to the subscriber stations. The addresses are assigned from the block to each of the subscriber stations in substantially contiguous sub-blocks based on the groupings. The groupings can be geographic or based on other desired criteria.

30 Claims, 9 Drawing Sheets

SYSTEM AND METHOD FOR TRAFFIC ROUTING

FIELD OF THE INVENTION

The present invention relates generally to computer networking and more particularly to a system and method for routing network traffic.

BACKGROUND OF THE INVENTION

Traffic on the Internet is carried using the Internet Protocol ("IP"). The most ubiquitous version of IP is version four ("IPV4"). The Internet has undergone enormous growth since the inception of the IPV4 standard, and the sheer number of networked devices is straining IPV4.

More specifically, IPV4 uses IP addresses to identify endpoints on networks and each networked device has a unique IPV4 address. A serious limitation of further Internet growth under IPV4 is the limited length of the address field. Since IPV4 uses a thirty-two bit addressing scheme of the format X.X.X.X, (where X is a value between zero and two-hundred-and-fifty-five), there are about four billion possible addresses. With the astonishing growth of the Internet, however, unique IP addresses are becoming scarce. As populous countries like China and India increase their appetite for the Internet, such addresses will become more scarce. IPV6 will offer relief by adding more addresses, but the upgrade of existing infrastructure from IPV4 to IPV6 is expected to be slow.

Even with the advent of IPV6, serious limitations remain with traffic routing over the Internet. Currently, IP addresses are administered by various organizations. For example, in North America IP addresses are administered by the American Registry for Internet Numbers ("ARIN"), a non-profit membership organization established for the purpose of the administration and registration of IP addresses. (See http://www.arin.net).

Due at least in part to scarcity of IP addresses, ARIN is currently somewhat reluctant to assign IP addresses freely. As a result, Internet Service Providers ("ISP") that have been assigned blocks of IP addresses by ARIN, and who serve subscribers across a disparate geographic area can find subscribers at opposite ends of the geographic area with IP addresses that are numerically quite close. For example, a subscriber of a first ISP located in Edmonton, Canada, could have the IP address A.A.A.A, while a subscriber of the same ISP who is located in Montreal, Canada, could have the IP address A.A.A+1.A. In other words, the IP address allocation may bear no relation to the geographic location of the subscriber. As a result, the IP addresses may not be aggregated efficiently and therefore complex routing tables and routers are maintained throughout the ISP's backbone to physically locate and deliver traffic to a computing device that is associated with a particular IP address. The resulting routing tables can become extremely bloated due to the need to send more specific routing announcements at each router in an attempt to accommodate the inefficient assignment of IP addresses.

Such suboptimal IP address assignments affect how traffic traverses the internet. When the ISP announces their network to other providers primarily via Exterior gateway protocol, other providers expect and may enforce some sort of IP address aggregation. If the aggregation occurs. The ISP may lose the ability to control the path the return-traffic may take to arrive to a particular computing device. This lose of route granularity caused by address aggregation may lead the second ISPs carrying the return-traffic to do "hot potato routing" (or sometimes known as "deflection routing"). Hot potato routing occurs where the second ISP does not receive path preferences instructions from the receiver of the return-traffic (the first ISP) or may not want to incur the cost of carrying traffic destined to subscribers of the first ISP. The second ISP will then try to dump the traffic onto first ISP at the closest or cheapest cost junction point For example, assume that the first ISP has junctions to a second ISP in Chicago and in Seattle for passing traffic between the two ISPs. Assume also a second ISP has traffic that originates in Florida which is destined for the Montreal subscriber having the address A.A.A+1.A. In normal situations the best and shortest path for the second ISP to deliver a packet to the first ISP may be the Chicago junction taking the least physical distance. With hot potato routing, the second ISP may dump the traffic to the junction between the two ISPs in Seattle that gets the traffic into the first ISP at a lower cost. This behaviour results in bigger issues like asymmetric routing and reduced performance due to the added distance a packet may take to reach the intended destination.

SUMMARY OF THE INVENTION

It is an object of the present invention to provide a novel system and method for traffic routing that obviates or mitigates at least one of the above-identified disadvantages of the prior art.

As aspect of the invention provides an apparatus for associating network addresses with a plurality of subscriber stations in a network. The apparatus comprises an engine for receiving a block of contiguous network addresses. The engine is operable to identify a grouping of the subscriber stations from the plurality of subscriber stations. The engine is operable to associate the block of contiguous network addresses with the at least one grouping.

The network addresses can be IP addresses.

The engine can be connected to a base station and the grouping can be identified by including all of the subscriber stations that are connected to the base station in the grouping. The apparatus can be further operable to provide the block to the base station. The base station can be operable to assign the addresses to the subscriber stations.

The engine can be connected to a base station and the grouping can be identified by including all of the subscriber stations that are connected to the base station in the grouping. The apparatus can be further operable to provide the block to the base station. The base station can be operable to assign the addresses to the subscriber stations.

The base station can be a BAS or a wireless base station in a wireless local loop or the like.

The engine can be further operable to assign the IP addresses directly to the subscriber stations.

The engine can be further operable to forward an identification of the block to a junction, such that traffic for the grouping of subscriber stations is routed through the junction.

The apparatus can be further operable to forward an identification of the block to one of a plurality of junctions, such that traffic for the grouping of subscriber stations is routed through the junction. The apparatus can be operable to make a selection of which one of the junctions presents a desired routing for the traffic. The desired routing can be based on at least one of cost, latency, bit error rate and geographic distance.

The grouping can be based on subscriber stations belonging to a single enterprise.

The grouping can be based on subscriber stations having a common location.

Another aspect of the invention provides a method of associating network addresses with a plurality of subscriber stations in a network comprising:

receiving a block of contiguous network addresses;

identifying a grouping of the subscriber stations from the plurality of subscriber stations;

associating the block of contiguous network addresses with the at least one grouping.

Another aspect of the invention provides a method of associating network addresses with a plurality of subscriber stations in a network comprising:

receiving subscriber station information;

determining address needs for the subscriber stations;

receiving blocks of network addresses for assignment to the subscriber stations; and, assigning network addresses to the subscriber stations according to groupings thereof.

Another aspect of the invention provides a computer readable media storing a set of programming instructions according to the aforementioned methods.

BRIEF DESCRIPTION OF THE DRAWINGS

The invention will now be described by way of example only, and with reference to the accompanying drawings, in which.

DETAILED DESCRIPTION OF THE INVENTION

Figure 1:
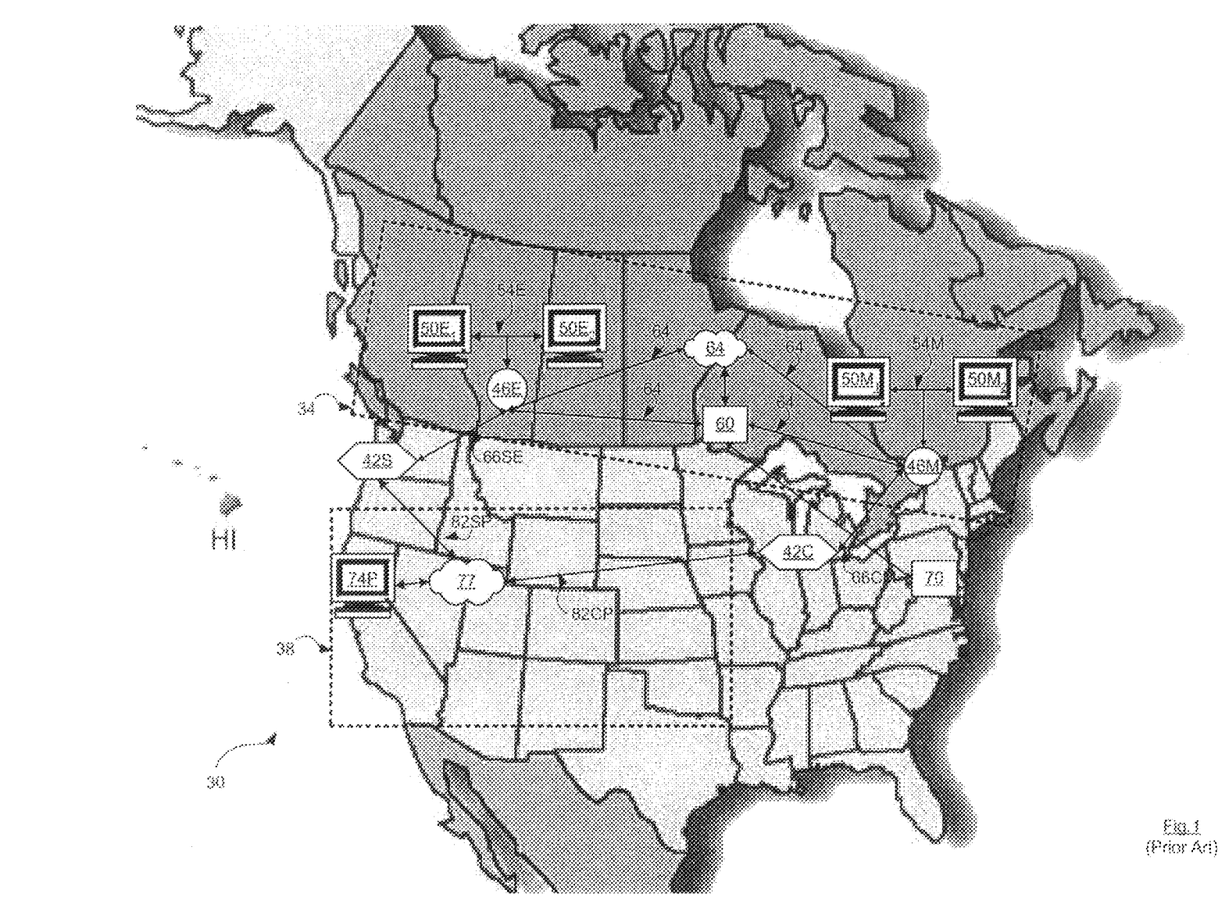
FIG. 1 is a schematic representation of an exemplary prior art system for traffic routing overlaid on the North America geographic region.
Figure 2:
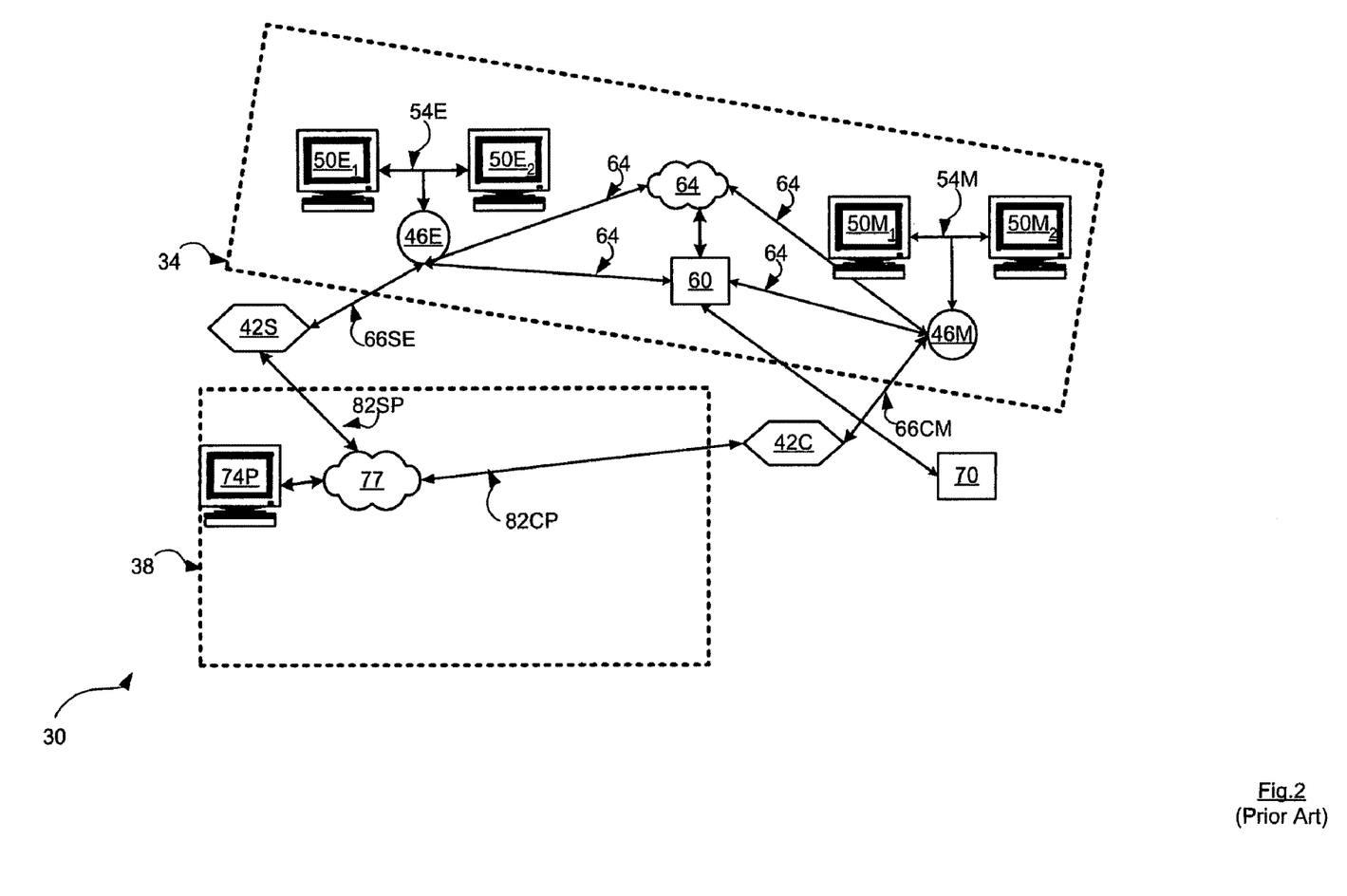
FIG. 2 is the schematic representation of the exemplary prior art system for traffic routing of FIG. 1 absent any geographic overlay.

Referring now to FIGS. 1 and 2, a prior art system for traffic routing is indicated generally at 30. System 30 comprises a first internet service provider ("ISP") 34 and a second ISP 38. ISP 34 and ISP 38 are represented as dotted-rectangles covering a portion of geographic area of North America ISPs 34 and 38 are connected by two junctions 42S and 42C, which pass traffic between each ISP 34 and 38. Those of skill in the art will now recognize that system 30 forms part of the broader Internet.

As can be seen from FIG. 1, ISP 34 is geographically spread across much of southern Canada, while ISP 38 spans a number of states of the USA that are west of the Mississippi. Junction 42S is located in Seattle, while junction 42C is located in Chicago. It is to be emphasized that the structure and geographic references in FIG. 1 are merely exemplary of a prior art system for routing traffic for the purposes of assisting in explanation only. FIG. 2 also shows system 30, but without the overlay onto the map of North America.

The area within each rectangle respective to ISP 34 and ISP 38 denotes the entire network infrastructure, including equipment belonging to the ISP and the customer premises equipment. Specific components within each ISP 34 and 38 are depicted within each rectangle.

More specifically, ISP 34 is based on a combination of digital subscriber line ("DSL") and dial-up architecture, and thus includes a plurality of broadband access servers ("BAS"), and in the present example these are indicated at 46E and 46M. BAS 46 is located in Edmonton, Alberta, while BAS 46M is located in Montreal, Quebec. (Generically BAS 46 and BAS 46M are referred to as BAS 46, and collectively BAS 46E and BAS 46M are referred to as BASes 46. This nomenclature is used for other components described herein).

BAS 46E services a plurality of subscriber stations $50E_1$ and $50E_2$ located within the Edmonton area. BAS 46M services a plurality of subscriber stations $50M_1$ and $50M_2$ located within the Montreal area. It should be understood that while only two subscriber stations 50 are shown for each BAS 46, in fact thousands or hundreds of thousands of subscriber stations can be served by each BAS 46. Each BAS 46 serves its subscriber stations via a city-wide DSL infrastructure 54 (indicated as 54E for BAS 46E, and 54M for BAS 54M) that is based on the public switched telephone network ("PSTN") of central offices, copper twisted pair, etc. in the usual manner.

ISP 34 also includes an Authentication Authorization and Accounting ("AAA") server 60 that connects to both BAS 46E and BAS 46M. AAA server 60 is based on any known AAA server utilizing an appropriate protocol(s) such as the Remote Authentication Dial-In User Service ("RADIUS") protocol and/or the Terminal Access Controller Access Control System ("TACACS") protocol or its variants including TACACS+ and/or the Internet Protocol Control Protocol ("IPCP"). Subscriber stations 50 will communicate with AAA server 60 through heir respective BAS 46 and utilize the appropriate protocol therewith in order to obtain access the network (i.e. the Internet) being offered by ISP 34.

ISP 34 also includes a plurality of other network components 60, including additional BASes, additional subscriber stations, additional AAA servers, routers, physical links therebetween, etc and other equipment that together comprise ISP 34. Network components 64 and BAS 46E connect to junction 42S via link 66SE, while network components 64 and BAS 46M connect to junction 42C via link 66CM. Thus, link 66SE includes the physical links, routers and other equipment that collectively comprise the shortest hop between BAS 46E and junction 42S. Similarly, link 66CM includes the physical links, routers, and other equipment that collectively comprise the shortest hop between BAS 46M and junction 42C.

AAA server 60 also connects to an P address administrator, which in the prior art example is ARIN, indicated at 70. AAA server 60 is operable to utilize IP addresses which have been assigned to ISP 34 by ARIN 70, which in turn can then be assigned to various subscriber stations 50 throughout ISP 34 via respective BASes 46.

ISP 38 is based on any known architecture, such as DSL, dial-up, cable-modem, combinations thereof, and thus includes at least one subscriber station 74P that is located in Palo Alto, Calif. Subscriber station 74P connects to other network components 77 (i.e. servers, routers, physical links therebetween, and other equipment), and together they comprise ISP 38. Network components 77 connect to junction 42S via link 82SP and to junction 42C via link 82CP. In this example, link 82SP includes the physical links, routers and other equipment that collectively comprise the hop between subscriber station 74P and junction 42S. Similarly, link 82CP includes the physical links, routers, and other equipment that collectively comprise the hop between subscriber station 74P and junction 42C. In this example, since subscriber station 74P is in Palo Alto, link 82SP is the shortest hop between subscriber station 74P and ISP 34, while link 82CP is the farthest hop between subscriber station 74P and ISP 34.

(It should be emphasized at this point, that while efficient (or otherwise desirable) routings are expressed in these examples in terms of a "shortest hop" in a geographic sense, other metrics for expressing efficient or desired routings are known and are applicable to the teachings herein. Other such metrics can include hops with a low or otherwise desirable latency, or a low or otherwise desirable bit error rate, or hops with that are more cost effective in relation to other hops. In the latter case, costing models can be extremely complex according to service agreements between ISPs or even within ISPs. Accordingly, "shortest hop" is used herein for sake of simplifying explanation, but other metrics can be applied to the teachings herein).

In operation, assume that initially subscriber stations 50 are not connected to the Internet and therefore not currently accessing ISP 34. Also assume that ISP 34 has requested IP addresses from ARIN 70 for use by AAA server 60, which responds to this request by assigning the Class "A" block of IP addresses 34.X.X.X (i.e. in the range of 34.0.0.0 through 34.255.255.255.) which are ultimately made available to AAA server 60. Note that while a Class "A" is used as an example, a Class "B" is more typical.

(Those of skill in the art will recognize that a Class A block of IP Addresses is a block of IP addresses where the first eight bits of the block of IP address are constant; a Class B block of IP Addresses is where the first sixteen bits of the block of IP address are constant and a Class C block of IP Addresses is a block of IP addresses where the first twenty-four bits of the block of IP address are constant Those of skill in the art will also recognize another nomenclature used to denote blocks of IP addresses is the "/N" nomenclature, where N denotes the first number of bits in the IP address that remains constant. Thus, where N equals eight, the block of IP addresses is known as a "/8" (pronounced "slash 8") block of IP addresses. A "/8" is equivalent to a Class A block; a "/16" is equivalent Class B block; and a "/24" is equivalent to a Class C block. The "/N" nomenclature also allows for granular identification of blocks of IP addresses (i.e. sub-masks), such as "/9" or "/22").

Next, assume that subscriber station $50E_1$ seeks access to ISP 34 by accessing BAS 46E; and via AAA server 60, subscriber station $50E_1$ is assigned the IP address 34.0.0.1. Then, in sequence subscriber station $50M_1$, subscriber station $50E_2$, subscriber station $50M_2$ likewise seek access to ISP 34, and are assigned IP address 34.0.0.2, IP address 34.0.0.3, and IP address 34.0.0.4 respectively.

Also assume that subscriber station 74P has already been assigned IP address 38.0.0.1.

Table I summarizes the above assumptions showing the IP addresses now associated with subscriber stations 50 and subscriber station 74P.

TABLE I

| Entry Number | ISP | City | Subscriber Station | IP Address |
|---|---|---|---|---|
| 1 | 34 | Edmonton | $50E_1$ | 34.0.0.1 |
| 2 | 34 | Montreal | $50M_1$ | 34.0.0.2 |

TABLE I-continued

| Entry Number | ISP | City | Subscriber Station | IP Address |
|---|---|---|---|---|
| 3 | 34 | Edmonton | $50E_2$ | 34.0.0.3 |
| 4 | 34 | Montreal | $50M_2$ | 34.0.0.4 |
| 5 | 38 | Palo Alto | 74P | 38.0.0.1 |

Additionally ISP 34 will "announce" the fact that the Class A block of IP address 34.X.X.X are associated with ISP 34 at junctions 42S and junctions 42C. Those of skill in the art will recognize that such a Class "A" announcement is made because the operator of junction 42S and junction 42C will, for reasons that include reducing the complexity in the functioning of each junction, only permit the announcement of IP addresses for a particular ISP in blocks—announcement of specific IP addresses are not permitted, or are impractical. Typically, the announcement can be as granular as Class "C", and in some circumstances possibly even lower, but generally it would be very impractical to announce at the specific IP address level).

Figure 3:
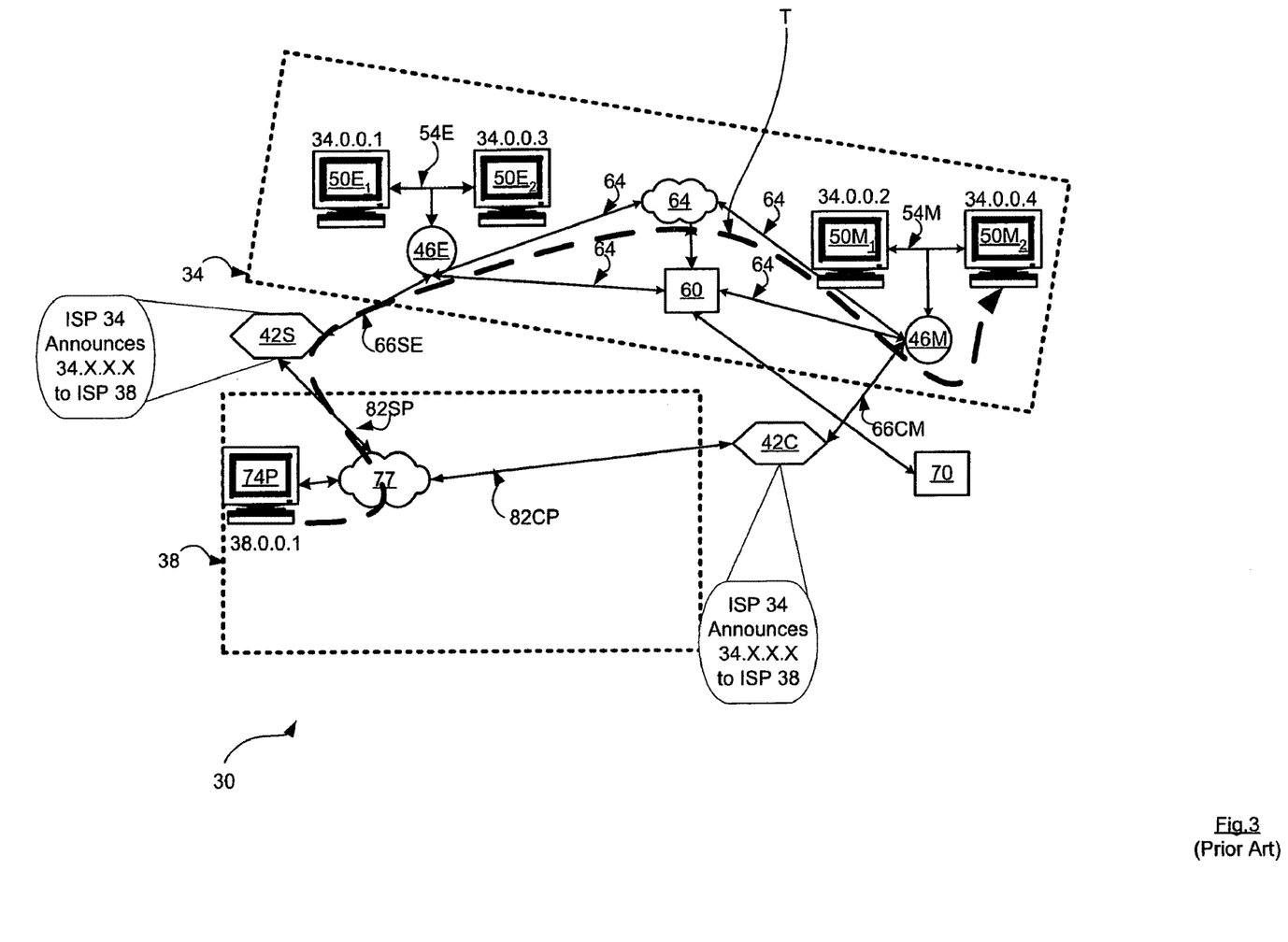
FIG. 3 shows the schematic representation of the prior art system in FIG. 2 with an exemplary pathway of traffic demonstrating a particular routing that can occur using the prior art system.

Now assume that subscriber station 74P originates traffic that is destined for subscriber station $50M_2$ located in Montreal, and thus such traffic will include the fact that the destination IP address is 34.0.0.4. Such traffic will then be sent to network components 77, which will examine junction 42S and junction 42C, and components 77 will note that since link 82SP is the shortest hop to get the traffic out of ISP 38, then ISP 38 will elect to route the traffic via junction 42S and thereby offload the burden of carrying the traffic onto ISP 34. A representation of these IP assignments and traffic routing is shown in FIG. 3, with the pathway for the traffic being represented by the dotted line indicated at reference T.

It will now be apparent that system 30 and the foregoing example of operation is highly simplified for purposes of explanation. However, a number of shortcomings of the prior art can be readily illustrated by this simplified example. Of particular note, it can be seen that when the addresses from the block of IP addresses 34.X.X.X are assigned to subscriber stations 50, the result is that an IP address for a given subscriber station 50 will bear little (or no) relationship to the geographic location of that subscriber station 50 when the aggregated routing statement is sent out to ISP 38. In a more complex real-world-prior art system, the assignment of IP addresses to all subscriber stations throughout ISP 34 from the block of IP addresses 34.X.X.X will result in the substantially chaotic scattering of addresses from that block throughout the entire geographic region covered by ISP 34. The scattering becomes even more chaotic as various subscriber stations periodically connect and disconnect to ISP 34, each time seeking a new IP address from the block of IP addresses available to ISP 34.

While ISP 34 can attempt to provision for growth in a particular geographic region of ISP 34 by manually reserving blocks of IP addresses for that region, such attempts will typically fail due to scarcity of IP addresses, as ARIN 70 will not allocate another block to ISP 34 until its original blocks have been used. Put in other words, due to scarcity of IP addresses, ISP 34 will have difficulty in simply seeking more Class A blocks of IP addresses from ARIN 70 until all addresses within block 34X.X.X are used by ISP 34. This forces ISP 34 to work, with that block throughout its geographic region until it is substantially utilized. However, once ISP 34 is permitted to obtain a second block of IP addresses from ARIN 70, the first block will be already scattered throughout the geographic region.

A still further problem that can arise in prior art system 30 is that routing tables within each ISP 34 and 38 and at junctions 42 will become bloated and therefore computationally stressful for the computing hardware that manages those routing tables. For example, it is not uncommon in some routing tables to see groupings into/16 and/32 s levels.

This computational stress can also lead to errors in announcements at junctions 42 and other router locations in system 30, resulting in asymmetric routing, where, for example traffic from subscriber station 74P will travel to subscriber station $50M_2$ via pathway T, but return traffic from subscriber station $50M_2$ will travel to subscriber station 74P via some other pathway, other than pathway T.

While not shown expressly in the Figures, an even more stark problem that can arise in system 30 is that traffic from one subscriber station to another will not necessarily follow the aggregate shortest pathway throughout system 30. For example, given current limitations in the prior art, it is possible for traffic originating from subscriber station 74P that is destined for subscriber station $54E_2$ to travel via junction 42C instead of junction 42S. This can occur, where, for example, link 82SP is already somewhat congested and therefore further traffic over link 82SP will be carried at a higher financial cost to ISP 38 than carrying that traffic over link 82CP. Despite the appearance, at that particular moment, of a perceived cost savings for ISP 38 to use link 82CP, in fact the net overall cost to ISP 38 may be much higher. For example, if the congestion on link 82SP is also due to inefficient routings caused by chaotic dispersion of IP addresses throughout a geographic area, the end result is that the inefficient routings simply accumulate.

Figure 4:
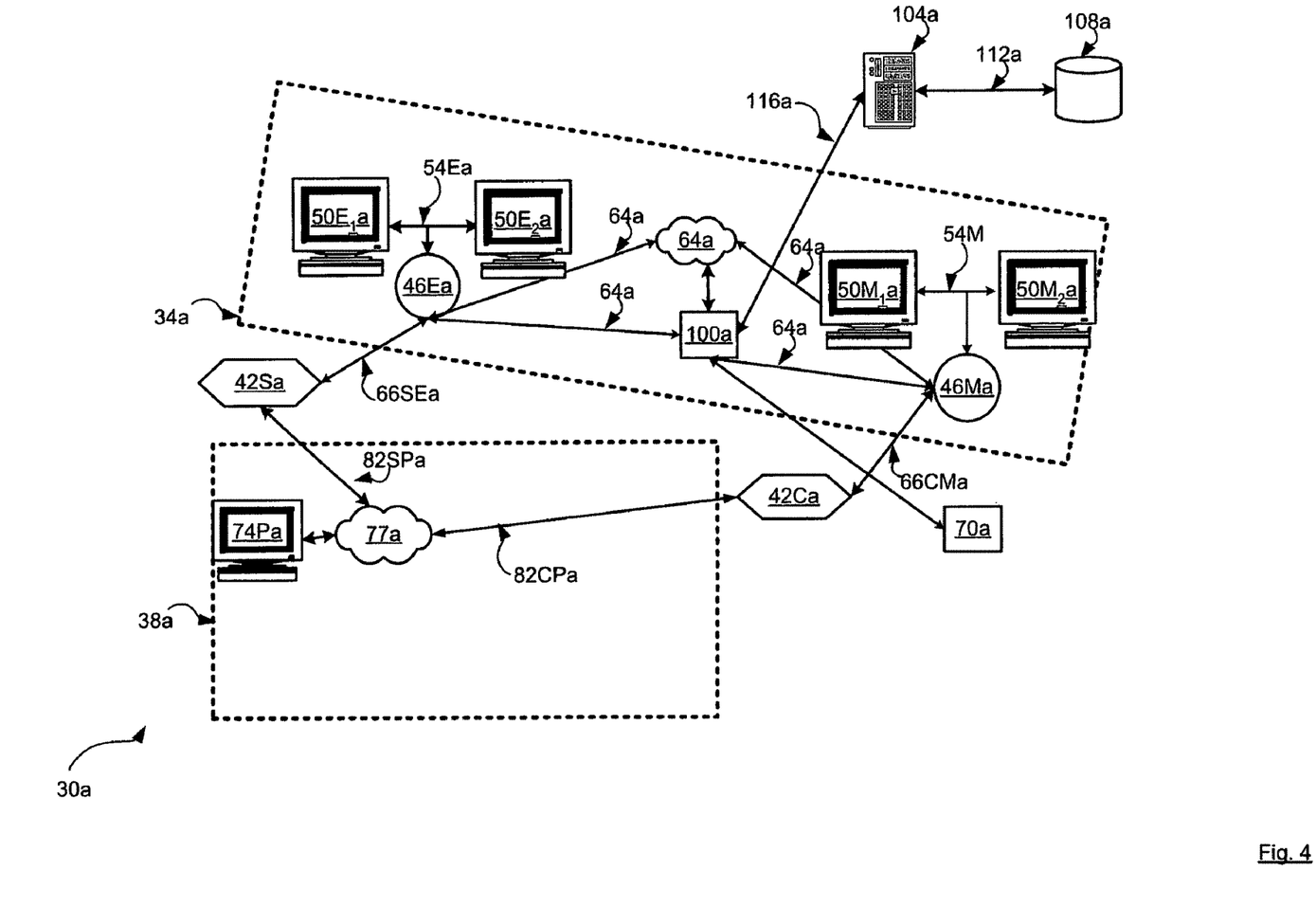
FIG. 4 is a schematic representation of a system for traffic routing in accordance with an embodiment of the invention.

In order to address at least one of these shortcomings, reference winnow be made to FIG. 4 wherein a system for routing traffic in accordance with an embodiment of the present invention is indicated generally at system 30a. System 30a includes many of the same elements as system 30 and components within the two systems that are substantially the same bear the same references, but the references in the components in system 30a are followed by the suffix "a". Of note, ISP 38 and ISP 38a are substantially the same, as are junctions 42 and 42a Similarly, ARIN 70 is substantially the same as ARIN 70a. By the same token, substantially all of the elements in ISP 34 are substantially the same as the elements in ISP 34a, except that ISP 34a includes an enhanced AAA server 100a. As another difference, server 100a has a direct connection to ARIN 70a to facilitate direct requesting of IP address blocks therefrom. (It will become apparent, however, that in varied embodiments of system 30a, such a direct connection is not needed).

Enhanced AAA server 100a includes substantially the same functionality as AAA server 60, but is also operable to assign IP addresses to subscriber stations 50a (via BASes 46a) according to groupings of IP addresses that substantially correspond to geographic groupings of subscriber stations 50a, based on instructions received from an address assignment engine 104a that has access to a subscriber information database 108a.

Address assignment engine 104a can be based on any general purpose computing device. For example, engine 104a can comprise a tower, connected to an electronic display (not shown) for presenting output to a user. The tower can also be connected to a keyboard and a mouse (not shown) for receiving input from a user. Other output devices, in addition to or in lieu of, the display and input devices, in addition to, or in lieu of, the display and keyboard and mouse, will occur to those of skill in the art.

The tower typically houses at least one central processing unit ("CPU") coupled to random access memory ("RAM") and one or more persistent storage devices (such as a hard disc drive) that will house subscriber information database 108a, via a bus 112a. As an example, a suitable at least one central processing unit can be at least one Pentium 4® central processing unit from Intel Corporation, Santa Clara Corporate Office, 2200 Mission College Blvd., Santa Clara, Calif. 95052-8119, USA. An exemplary operating system which can be used on the tower of engine 104a is Windows XP® from Microsoft Corporation, One Microsoft Way, Redmond, Wash. 98052-6399, USA. The resulting computing environment of engine 104a, in this example, is often referred to as an Intel-based machine running Windows XP. However, other computing environments, such as Linux-based computing environments or computing environments promulgated by Sun Microsystems of Palo Alto, Calif., USA, including different central processing units and/or different operating systems and/or other components of engine 104a will occur to those of skill in the art and are within the scope of the invention. In a present embodiment, the tower of engine 104a also includes a network interface card that connects engine 104a to AAA server 100a, via link 116a.

Subscriber information database 108a is populated by a business office or other administrative entity of ISP 34a, and includes information about all subscribers who have subscriber stations 50a that are to seek access to the Internet via ISP 34a. Thus engine 104a will typically include some sort of network connection not shown in FIG. 4, in order to simplify explanation, that allows the business office of ISP 34a to populate database 108a (however, such a connection can include, for example, a direct link between engine 104a and each BAS 46a in ISP 34a) Table II shows a simple example of the structure of the database and data populated therein.

TABLE II

Exemplary Contents of Database 108a

| Entry Number | City | BAS | Subscriber Station |
|---|---|---|---|
| 1 | Montreal | 46Ma | $50M_1a$ |
| 2 | Montreal | 46Ma | $50M_2a$ |
| 3 | Edmonton | 46Ea | $50E_1a$ |
| 4 | Edmonton | 46Ea | $50E_2a$ |

Table II thus contains a list of all subscriber stations 50a that are shown in FIG. 4, and thus represents all subscriber stations 50a that wish to access the Internet via ISP 34a Column I of Table II, "Entry Number" provides a unique index number for that particular subscriber station 50E Column 2 of Table II, "City" identifies the city for that particular subscriber station 50a Column 3 of Table II "BAS" identifies the BAS 46 for that particular subscriber station 50a. Column 4 of Table II, "Subscriber Station" identifies the specific subscriber station 50a.

It is now to be reemphasized that Table II, and system 30a are highly simplified for purpose of assisting in explanation. In fact, database 108a can include thousands or hundreds-of-thousands of entries, which will be associated with dozens of cities (or other population centres) spread across ISP 34a. Furthermore, each city can have a plurality of BASes 46 that are in physical proximity to a plurality of subscriber stations 50a within database 108a (or example, across the geographic region serviced by ISP 34a, other centres will include, at least, the Canadian cities of Vancouver, Calgary, Saskatoon, Winnipeg, Toronto, Ottawa, and Quebec City, and each of those centres will have a plurality of BASes, and a plurality of subscriber stations associated therewith).

It should also be understood that database 108a is dynamic, constantly being updated as new subscriber stations 50a seek access to ISP 34a, while other subscriber stations 50a may choose to discontinue accessing the Internet via ISP 34a, perhaps switching service to another ISP), and therefore entries for such subscriber stations 50a will be deleted from database 108a.

To further stress the level at which Table II is simplified for explanation purposes, it should be understood that in the present embodiment each subscriber station 50a represents a physical piece of hardware that is geographically proximal to its respective BAS 46a. Thus, while not expressly discussed herein, it should be understood that the authentication of a given subscriber or user (via protocols such as Point-to-Point Protocol over Ethernet. ("PPPOE")) into ISP 34a using that particular subscriber station 50a occurs on another layer of processing not expressly discussed herein. Thus, where subscriber stations 50a are voice-over IP ("VOIP") subscriber stations, or laptops, or other nomadic types subscriber stations that can physically move with the user from location-to-location, then as those nomadic subscriber stations are moved and connect with different BASes 46a, those subscriber stations can be populated in Table II as described herein, but the authentication of the actual user, and the granting of that user access to ISP 34a associated with that nomadic subscriber station, will occur in a manner not expressly discussed herein but which will occur to those of skill in the art.

Figure 5:
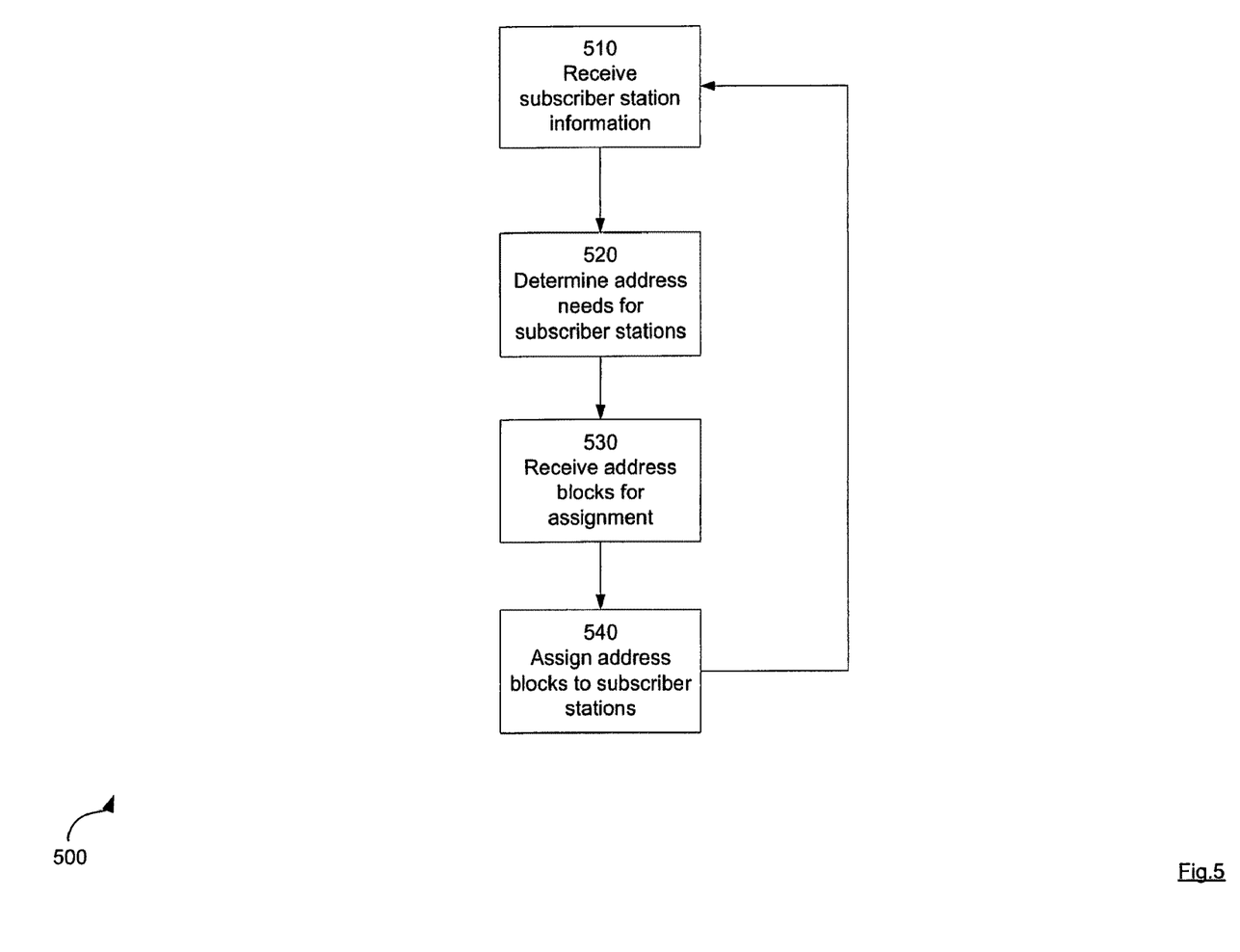
FIG. 5 shows a flow-chart depicting a method of assigning addresses in accordance with an embodiment of the invention.

Referring now to FIG. 5, a method for assigning addresses in accordance with an embodiment of the invention is indicated generally at 500. In order to assist in the explanation of the method, it will be assumed that method 500 is operated using system 30a, and method 500 will make use of database 108a assuming it holds the contents of Table II. Furthermore, the following discussion of method 500 will lead to further understanding of system 30a and its various components. (However, it is to be understood that system 30a and/or method 500 can be varied, and need not work exactly as discussed herein in conjunction with each other, and that such variations are within the scope of the present invention).

Beginning first at step 510, subscriber station information is received. On system 30a, such information is received by engine 104a by loading the contents of Table II from database 108a onto engine 104a via bus 112a.

Next, at step 520, a determination is made as to the need for address for the subscriber stations. Continuing with the present example, step 520 will examine the contents of engine 104a and determine that four IP addresses are needed to satisfy the current demand for IP addresses in ISP 34a. Further, at step 520, engine 104a will also determine that BAS 46Ma needs two of those addresses, while BAS 46Ea needs two more of those addresses. (In this manner, engine 104a groups IP address needs by geographic region).

In a present embodiment the determination at step 520 goes no fisher than what is described in the previous paragraph. However, in other embodiments, step 520 can include an instruction set for execution on engine 104a that considers future expectations for needs for each BAS 46Ea, such expectations being provided based on projections for growth in ISP 34a Other, more sophisticated criteria can be used for the determination at step 520, as desired. Such determined information will then be passed on to AAA server 100a for later use.

Next, at step 530, address blocks are received for assignment to subscriber stations 510a. This step can be performed by AAA server 100a making a request to ARIN 70a for a block of IP addresses. AAA server 100a can make a request for a number of IP addresses based on the results of step 520. Thus, the request will be for at least four IP addresses, however, more typically, the number of requested IP addresses will be more than the number of IP addresses actually determined as needed at step 520, in order to allow for further growth. In the present example, it will be assumed that a Class A block of IP addresses will be received. While this number of IP addresses far exceeds the four subscriber stations in system 30a, it will be understood that this is simply for purposes of simplifying explanation of the present embodiment.

Figure 6:
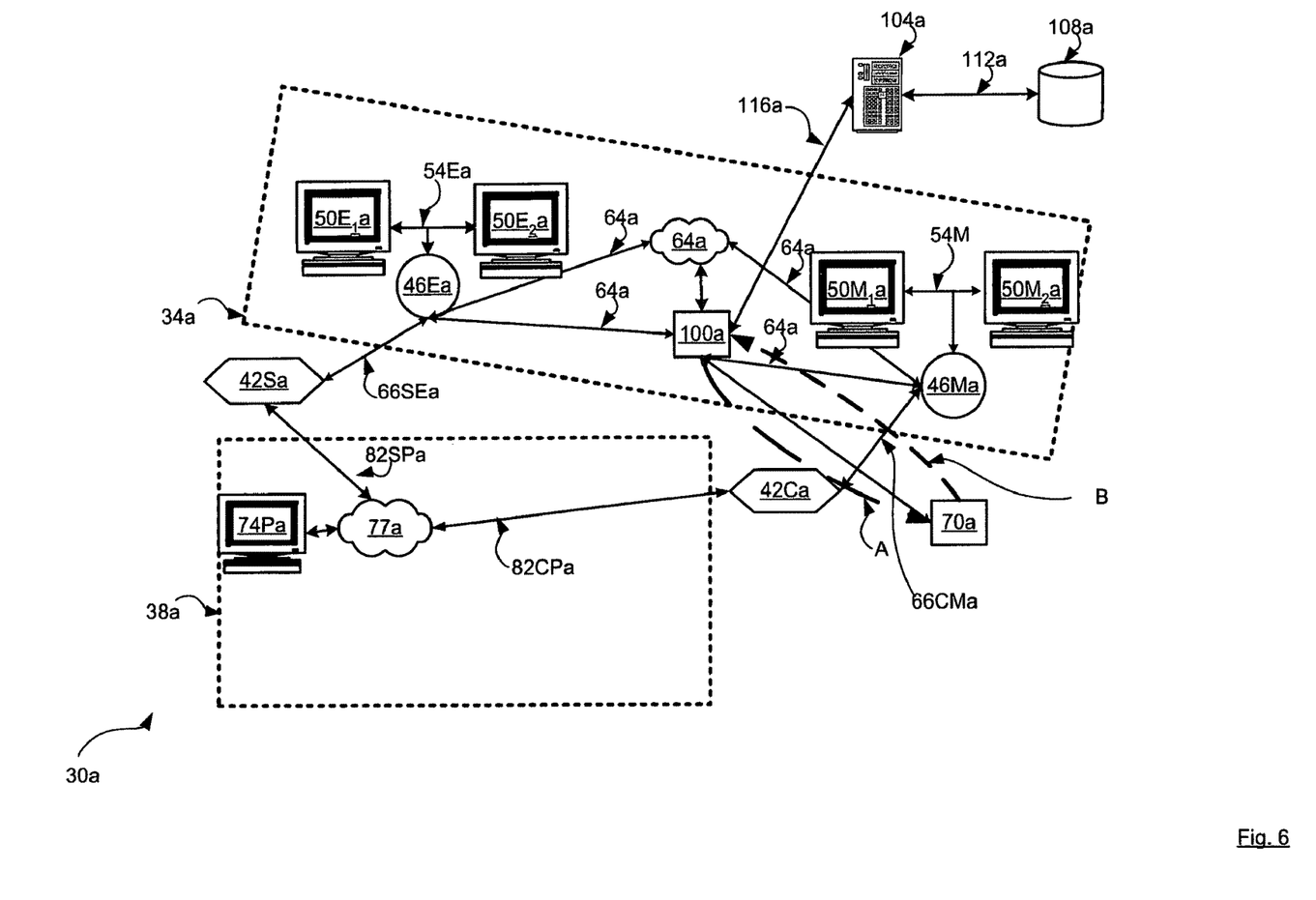
FIG. 6 shows the system of FIG. 4 during performance of the method of FIG. 5.

Performance of this step is represented in FIG. 5, where a request from AAA server 100a to ARIN 70a is represented by a dotted line indicated at A, and a response is represented by a dotted line from ARIN 70a to AAA server 100a indicated at B. In this example, it will be assumed that response B is the Class A block of IP addresses 34.X.X.X (As another way of performing step 530, obviating the direct connection with ARIN 70a, is that it can be assumed that blocks of IP addresses have already been assigned to ISP 34a and that such blocks of IP addresses are already stored in a storage device at (or otherwise available to) AAA server 100a).

Next, at step 540, address blocks are assigned to subscriber stations. Continuing with the present example, this step is performed by both engine 104a working with server 100a and BASes 46a. Since, at step 520, it was determined that at least two IP addresses were needed for BAS 46Ma, and at least two IP addresses were needed for BAS 46Ea, a simple assignment would be to give two Class B blocks to each BAS 46. Table III shows an example of how such Class B blocks may be appear.

TABLE III

Exemplary Assignment of Blocks of IP addresses

| City | BAS | Class B Block |
|---|---|---|
| Montreal | 46Ma | 34.0.X.X |
| Edmonton | 46Ea | 34.111.X.X |

Thus, Column 1, "City" indicates the City associated with the assigned block of IP addresses. Column 2, "BAS", indicates the BAS that will be assigned a particular block of IP addresses. Column 3 "Block", indicates the specific block of IP addresses that are assigned to a respective BAS 46. More particularly, for Montreal, BAS 46Ma is given the block of IP addresses in the range 34.0.0.0 to 34.0.255.255, while for Edmonton, BAS 46Ea is given the block of IP addresses in the range 34.111.0.0 to 34.111.255.255.

Having provided blocks of IP addresses for each BAS 46a, the next part of step 540 is to actually assign addresses to specific subscriber stations. Building on Table III, Table IV shows an example of how such IP addresses can be assigned.

TABLE IV

Exemplary Assignment of IP addresses to subscriber stations

| City | BAS | Class B Block | Subscriber Station | IP Address |
|---|---|---|---|---|
| Montreal | 46Ma | 34.0.X.X | $50M_1a$ | 34.0.0.1 |
| Montreal | 46Ma | 34.0.X.X | $50M_2a$ | 34.0.0.2 |
| Edmonton | 46Ea | 34.111.X.X | $50E_1a$ | 34.111.0.1 |
| Edmonton | 46Ea | 34.111.X.X | $50E_2a$ | 34.111.0.2 |

Figure 7:
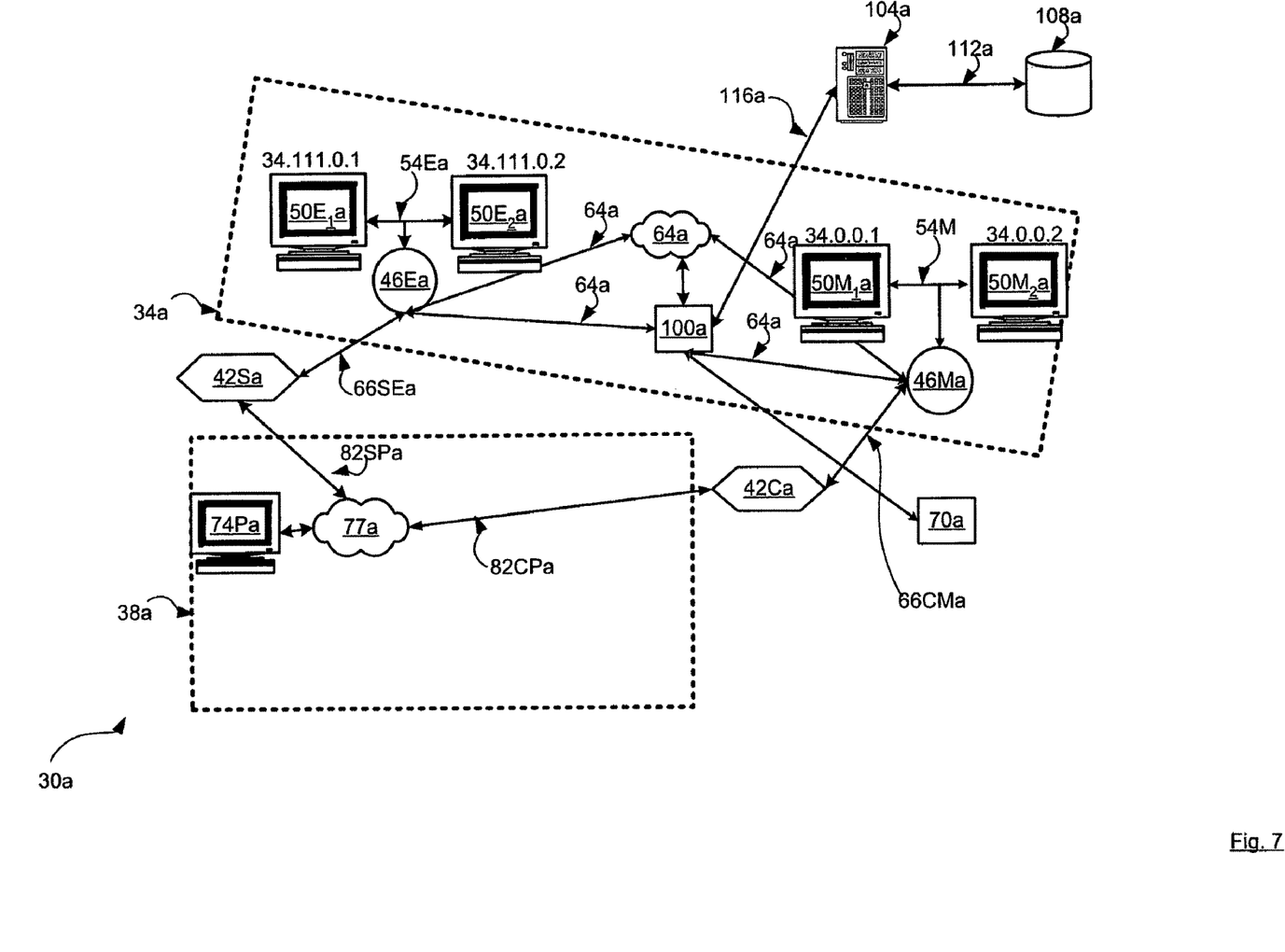
FIG. 7 shows the system of FIG. 4 during performance of the method of FIG. 5.

Thus, it can be seen in Table IV that the first three column headings of Table IV are the same as the first three headings of Table III, and include data from Table III. Additionally, in Table IV, subscriber station 50M1a is assigned the IP address 34.0.0.1; subscriber station 50M2a is assigned the IP address 34.0.0.2; subscriber station 50E1a is assigned the IP address 34.111.0.1; subscriber station 50E2a is assigned the IP address 34.111.0.2. This assignment is shown in FIG. 7, with the corresponding IP address being labelled above the corresponding subscriber station 50a.

In other words, subscriber stations 50Ma in the Montreal area will be associated with the Class B block of IP addresses 34.0.X.X, while subscriber stations 50Ea in the Edmonton area will be associated with the Class B block of IP addresses 34.111.X.X.

In this manner, method 500 can then continually cycle to keep updating Table IV.

At this point, junctions 42a can now be updated to announce blocks of IP addresses that correspond substantially to the shortest (or otherwise desired) hop for incoming traffic to a destination subscriber station 50a within ISP 34a. More particularly, junction 42Sa can be instructed to only announce blocks 34.111.X.X, while junction 42Ca can be instructed to only announce blocks 34.0.X.X.

Figure 8:
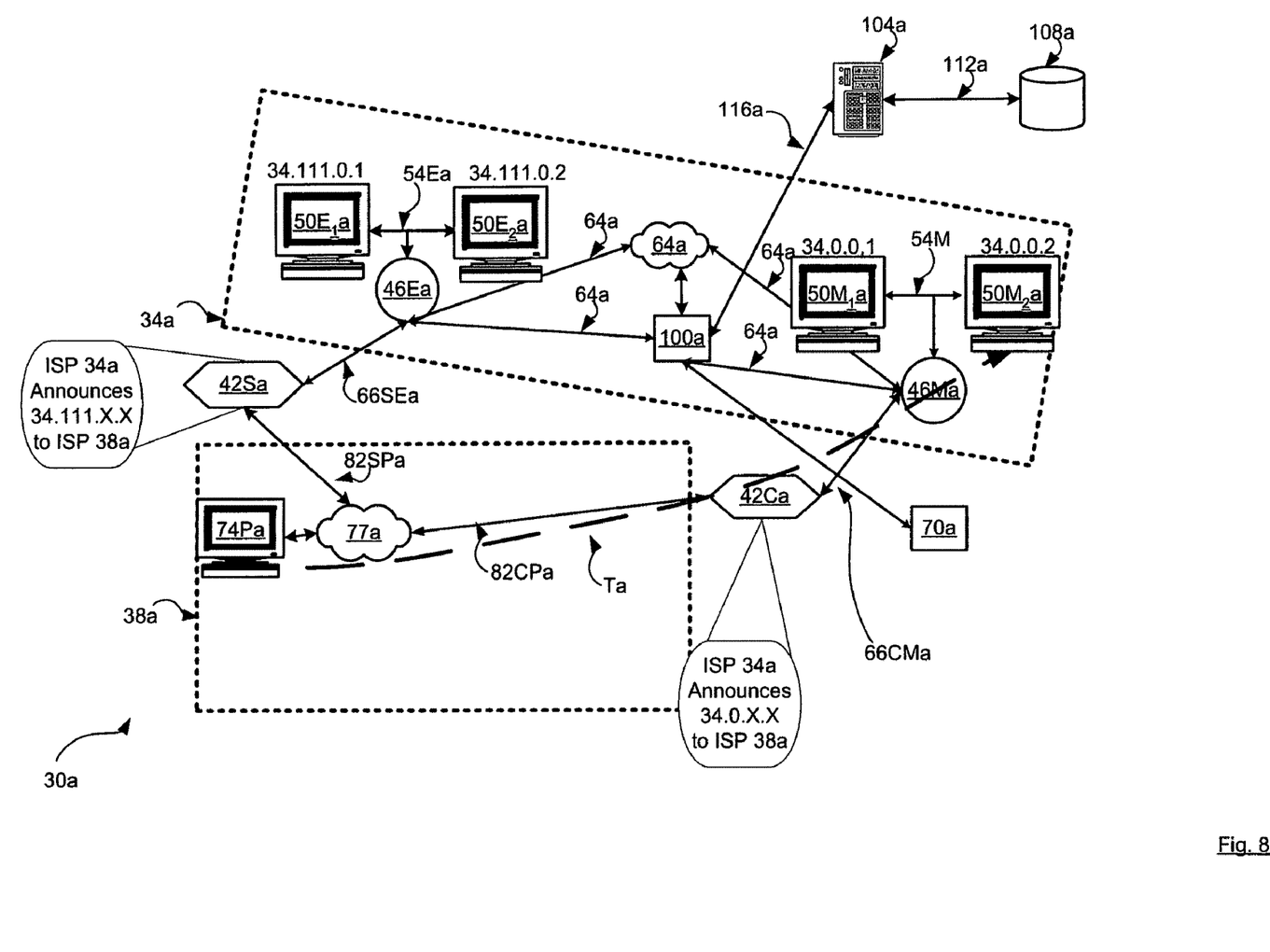
FIG. 8 shows the system of FIG. 4 during performance of traffic routing upon completion of the method of FIG. 5; and, FIG. 9 shows a modified version of the system of FIG. 4 during performance of the method of FIG. 5.

Now assume that subscriber station 74Pa in Palo Alto originates traffic that is destined for subscriber station 50M₂a located in Montreal, and thus such traffic will include the fact that the destination IP address is 34.0.0.2 Such traffic will then be sent to network components 77a, which will examine junction 42Sa and junction 42Ca While junction 42Sa is still the shortest hop to ISP 34a, components 77a will note that only junction 42Ca is announcing IP addresses in the blocks 34.0.X.X, and thus ISP 38a will route the traffic to BAS 46Ma via junction 42Ca and link 66CMa. A representation of the IP assignments from Table IV and exemplary traffic routing is shown in FIG. 8, with the pathway for the traffic being represented by the dotted line indicated at reference Ta. In this manner, ISP 38a will assume more of the burden for carrying the traffic, as compared to the prior art system and the example in FIG. 3.

(It should be noted that, while FIGS. 3 and 8 refer to announcements of particular blocks of IP addresses, it should be understood such announcements are typically in terms of order of preference. For example, in FIG. 8 junctions 42a would typically announce most or all destination IP addresses within ISP 34a to ISP 38a, but such announcements will be in terms of order of preference for receiving traffic. Thus, in the example in FIG. 8, while junction 42Sa announces itself as the preferred junction for addresses 34.111.X.X, (shown in FIG. 8) junction 42Sa also announces itself as the less preferred junction for addresses 34.0.X.X (not shown in FIG. 8). By the same token, while junction 42Ca announces itself as the preferred junction for addresses 34.0.X.X, junction 42Ca will announces itself as the less preferred junction for addresses 34.111.X.X. This order of preferences is used in the event of a failure at the other junction).

As previously mentioned, method 500 can continually cycle to keep updating Table IV, in particular to continue providing IP addresses for subscriber stations 50a that are substantially grouped according to a common geographic area Such continuous cycling will substantially maintain such geographic groupings as subscriber stations 50a are connected to or disconnected from ISP 34. For example, as seen in FIG. 9, assume that Edmonton-based subscriber station 50Ea disconnects from ISP 34a, a new Montreal-based subscriber station 50Ea connects to ISP 34a During a cycle of method 500, Table IV will thus be updated to produce Table V.

TABLE V

Figure 9:
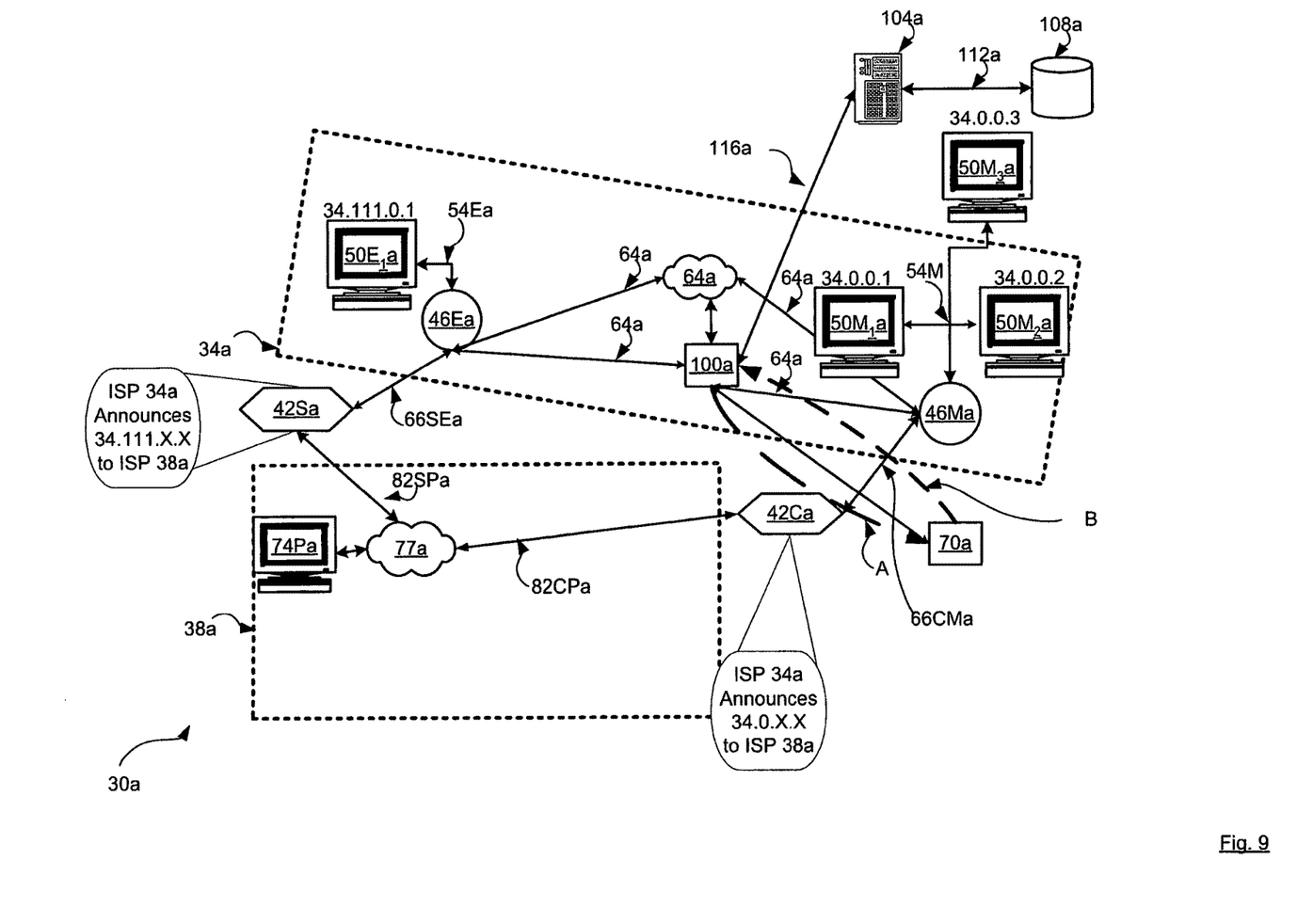

Exemplary Assignment of IP addresses to subscriber stations (FIG. 9)

| City | BAS | Class B Block | Subscriber Station | IP Address |
|---|---|---|---|---|
| Montreal | 46Ma | 34.0.X.X | 50M₁a | 34.0.0.1 |
| Montreal | 46Ma | 34.0.X.X | 50M₂a | 34.0.0.2 |
| Montreal | 46Ma | 34.0.X.X | 50M₃a | 34.0.0.3 |
| Edmonton | 46Ea | 34.111.X.X | 50E₁a | 34.111.0.1 |

Thus, the IP addresses are updated in a manner such that they remain substantially grouped by geographic region and the announcements of blocks of IP addresses at junctions 42a still substantially ensure that the distance between that junction 42a and a given subscriber station 50a is substantially the shortest hop.

It should now be apparent that sophisticated criteria and processing can be used by engine 104a and or server 100a to assign IP addresses. For example, assume that during the performance of method 500, the contiguous blocks of IP addresses in the range of 34.0.0.0 through 34.110.255.255 are all assigned to and used by subscriber stations 50M in the Montreal area. This leaves no additional space for contiguous IP addresses to be assigned to subscriber stations 50M in the Montreal area, since addresses of the range 34.111.X.X. are reserved for Edmonton. To accommodate this situation, a block of IP addresses could be set aside as a "swap" block, for purposes of swapping out Edmonton IP addresses from the 34.111.X.X. space and freeing up that space for the Montreal subscriber stations. The number of extra IP addresses for a swap block can be any desired number, but is presently preferred to be at least an extra five percent of IP addresses, and more presently preferred to be at least an extra ten percent, and more presently preferred to be at least an extra fifteen percent.

As a variation to method 500, and prior to any subscriber stations 50a seeking access to any BAS 46a, system 30a can be initially operated by estimating a number of subscriber stations that are expected for a particular BAS 46a, and assigning a block of IP addresses for that BAS 46a corresponding to that estimate, plus an extra number of IP addresses within that block to account for a margin of error. As they seek access to a BAS 46a, subscriber stations 50a can be assigned IP addresses from those pre-assigned blocks for a predefined period of time until the average number of subscriber stations 50a accessing that particular BAS 46a substantially stabilizes. Once stabilized, the number of unused IP addresses, if any, can be assessed, and a swapping operation can be performed to bring that number of unused IP addresses to a desired buffer to accommodate fluctuations in the number of subscriber stations 50a accessing a particular BAS 46a. Again, such swapping operations and overall assignments of IP addresses urge ISP 34a towards having substantially contiguous blocks of IP addresses associated with a particular BAS 46a (or other measure of geographic proximity).

Other criteria and variations for operating system 30a will now occur to those of skill in the art.

While only specific combinations of the various features and components of the present invention have been discussed herein, it will be apparent to those of skill in the art that desired subsets of the disclosed features and components and/or alternative combinations of these features and components can be utilized, as desired. For example, it should be understood that AAA server 100a, device 104a and database 108a can be housed in a singled device. Alternatively, device 104a and database 108a can connected to a plurality of AAA servers 100*a* distributed throughout ISP 34*a*. Alternatively, device 104*a* and database 108*a* can connected to a plurality of AAA servers 100*a* distributed throughout a plurality of ISPs.

As an additional example, while such announcements at junctions 42*a* (as seen in FIG. 9) were chosen for the shortest hop from a junction 42*a* to a given subscriber station 50*a*, any desired criteria or metrics, or combinations thereof, for which junctions are to announce blocks IP addresses can be employed. By the same token, while assignments of IP addresses are made for geographic commonality any desired criteria for assigning IP addresses can be employed. For example, groupings could be made by bandwidth of the "last mile" physical link between the ISP and the subscriber station that is servicing the particular subscriber station. As another example, groupings could be made such that certain junctions announce blocks of IP addresses where the cost to carry traffic to and from that junction is more preferred than some other junction. By the same token, the junctions where such announcements are made can be dynamically changed, announcing, for example, at junction 42Sa at one moment, but then at junction 42Ca another, as the most desired pathway changes. Due to the groupings, such changes in announcements can be made relatively swiftly and efficiently.

As another variation, AAA server 100*a* (or other engine 104*a* or the like) can also be provided with knowledge of bandwidth statistics (i.e. consumption, availability) over any particular link in ISP 34*a*, using a product such as Cisco IOS NetFlow ("Netflow") from Cisco Systems, Inc., 170 West Tasman Drive San Jose, Calif. 95134 USA. These statistics can be combined method 500 to help determine the most desirable one of junctions 42*a* on which to announce a particular grouping of IP addresses. By the same token, such statistics can be used to watch for bi-directional traffic, to monitor whether traffic is flowing symmetrically through a particular junction 42*a* and modify announcements at that junction 42*a* to urge traffic to flow in a substantially symmetric manner.

As another example, it should be understood that BAS 46*a* can be substituted for other functionally equivalent equipment as needed, and thus, a BAS, per se, is not needed in order to effect substantially contiguous assignment and administration of blocks of IP addresses by geographic region (or other criteria). For example, in a wireless local loop network, with a wireless base station serving a plurality of wireless subscriber stations, then each wireless base station can be treated in the same manner as each BAS 46*a*.

It should also be understood that the teachings herein are applicable to other systems where assignment of addresses (or the like), other than IP addresses, can result in non-contiguous blocks of addresses being associated with a particular geographic area Telephone numbers are but one other example.

As a still further example, it should be understood that system 30*a* is scalable. For example, the configuration of ISP 34*a* can be applied to ISP 38*a*, with suitable modifications. Similarly, system 30*a* in its entirety can have contiguous blocks of IP addresses assigned according teachings herein, such that system 30*a* interfaces with the broader Internet with substantially contiguous blocks of IP addresses by geographic region. By the same token, groupings of IP addresses can be performed on a smaller scale, within a particular sub-region respective to a particular ISP 48. It should now be apparent that, in general, the fact that different ISPs are operated as separate businesses needed not dictate how teachings herein are implemented in order to organize IP addresses across the Internet.

The present invention thus provides a novel system, method and apparatus for traffic routing. Embodiments can result in groupings of IP address assignments according to geographic area or other desired criteria As a result, overall routing of traffic through the Internet is generally more efficient than prior art IP address assignments which can be very chaotically dispersed across large geographic areas—particularly where large ISPs are involved. Additionally, routing tables throughout the Internet have reduced complexity and are generally less bloated, thereby also improving efficiency of Internet traffic. Other benefits and advantages over the prior art will now occur to those of skill in the art.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. An apparatus for associating network addresses with a plurality of geographic regions; said apparatus comprising an engine operable to receive a block of contiguous network addresses; to associate a first range of contiguous network addresses within the block of contiguous network addresses with a first geographic region, each of a plurality of subscriber stations within the first geographic region to be assigned a network address from the first range of contiguous network addresses; and to associate a second range of contiguous network addresses within the block of contiguous network addresses with a second geographic region, each of a plurality of subscriber stations within the second geographic region to be assigned a network address from the second range of contiguous network addresses.

2. The apparatus of claim 1, wherein said network addresses are IP addresses.

3. The apparatus of claim 1, wherein said engine is connected to a base station physically proximate to the subscriber stations within the first geographic region; said apparatus further operable to provide said first range of contiguous network addresses to said base station; said base station operable to assign network addresses within said first range of contiguous network addresses to the subscriber stations within the first geographic region.

4. The apparatus of claim 3, wherein said base station is selected from the group consisting of a broadband access server and a wireless base station in a wireless local loop.

5. The apparatus of claim 1, wherein said engine is further operable to assign network addresses within the first range of contiguous network addresses directly to subscriber stations within the first geographic region.

6. The apparatus of claim 5, wherein said engine is further operable to assign network addresses within the second range of contiguous network addresses directly to subscriber stations within the second geographic region.

7. The apparatus of claim 1, wherein said engine is further operable to forward an identification of said first range of contiguous network addresses to a junction, such that traffic for said first grouping of said subscriber stations is routed through said junction.

8. The apparatus of claim 1, wherein said apparatus is further operable to forward an identification of said first range of contiguous network addresses to a first one of a plurality of geographically disparate junctions, such that traffic for said subscriber stations within the first geographic region is routed through said first junction; said apparatus operable to make a selection of which one of said geographically disparate junctions presents a desired routing for the traffic for said subscriber stations within the first geographic region.

9. The apparatus of claim 8, wherein said apparatus is further operable to forward an identification of said second range of contiguous network addresses to a second one of said plurality of geographically disparate junctions different from said first junction, such that traffic for said subscriber stations within the second geographic region is routed through said second junction; said apparatus operable to make a selection of which one of said geographically disparate junctions presents a desired routing for the traffic for said subscriber stations within the second geographic region.

10. The apparatus of claim 8, wherein said desired routing is based on at least one of cost, latency, bit error rate and geographic distance.

11. The apparatus of claim 1, wherein the first geographic region comprises a first population center and the second geographic region comprises a second population center physically distant from the first population center.

12. The apparatus of claim 1, wherein the engine is further operable to assign a network address to a subscriber station based upon the geographic region of the subscriber station, the network address being within the first range of contiguous network addresses or being within the second range of contiguous network addresses depending upon the geographic region of the subscriber station.

13. The apparatus of claim 1, wherein the engine is further operable to assign a block of network addresses to a base station based upon the geographic region of the base station, the block of network addresses comprising a portion of the first range of contiguous network addresses or a portion of the second range of contiguous network addresses depending upon the geographic region of the base station.

14. A method of associating network addresses with a plurality of geographic regions comprising:
    receiving a block of contiguous network addresses;
    associating a first range of contiguous network addresses within said block of contiguous network addresses with a first geographic region, each of a plurality of subscriber stations within the first geographic region to be assigned a network address from the first range of contiguous network addresses; and
    associating a second range of contiguous network addresses within said block of contiguous network addresses with a second geographic region, each of a plurality of subscriber stations within the second geographic region to be assigned a network address from the second range of contiguous network addresses.

15. The method of claim 14, wherein said network addresses are IP addresses.

16. The method of claim 14, wherein said associating a first range of contiguous network addresses with said subscriber stations within the first geographic region comprises assigning the first range of contiguous network addresses to a base station physically proximate to the subscriber stations within the first geographic region, the base station operable to assign network addresses within the first range of contiguous network addresses to the subscriber stations within the first geographic region.

17. The method of claim 16, wherein said base station is selected from the group consisting of a broadband access server and a wireless base station in a wireless local loop.

18. The method of claim 14 further comprising assigning network addresses within the first range of contiguous network addresses directly to subscriber stations within the first geographic region.

19. The method of claim 18 further comprising assigning network addresses within the second range of contiguous network addresses directly to subscriber stations within the second geographic region.

20. The method of claim 14 further comprising forwarding an identification of said first range of contiguous network addresses to a junction, such that traffic for said subscriber stations within the first geographic region is routed through said junction.

21. The method of claim 14 further comprising: selecting a first one of a plurality of geographically disparate junctions which presents a desired routing for traffic for said subscriber stations within the first geographic region; and forwarding an identification of said first range of contiguous network addresses to said first junction, such that traffic for said subscriber stations within the first geographic region is routed through said first junction.

22. The method of claim 21 further comprising: selecting a second one of a plurality of geographically disparate junctions different from said first junction which presents a desired routing for traffic for said subscriber stations within the second geographic region; and forwarding an identification of said second range of contiguous network addresses to said second junction, such that traffic for said subscriber stations within the second geographic region is routed through said second junction.

23. The method of claim 21, wherein said desired routing is based on at least one of cost, latency, bit error rate and geographic distance.

24. The method of claim 14, wherein the first geographic region comprises a first population center and the second geographic region comprises a second population center physically distant from the first population center.

25. The method of claim 14 further comprising assigning a network address to a subscriber station based upon the geographic region of the subscriber station, the network address being within the first range of contiguous network addresses or being within the second range of contiguous network addresses depending upon the geographic region of the subscriber station.

26. The method of claim 14 further comprising assigning a block of network addresses to a base station based upon the geographic region of the base station, the block of network addresses comprising a portion of the first range of contiguous network addresses or a portion of the second range of contiguous network addresses depending upon the geographic region of the base station.

27. Computer-readable medium containing a program element executable by a processor to perform a method of associating network addresses with a plurality of geographic regions, the computer-readable medium comprising:
    first program code for receiving a block of contiguous network addresses;
    second program code for associating a first range of contiguous network addresses within said block of contiguous network addresses with a first geographic region, each of a plurality of subscriber stations within the first geographic region to be assigned a network address from the first range of contiguous network addresses; and
    third program code associating a second range of contiguous network addresses within said block of contiguous network addresses with a second geographic region, each of a plurality of subscriber stations within the second geographic region to be assigned a network address from the second range of contiguous network addresses.

28. The computer-readable medium of claim 27, wherein the first geographic region comprises a first population center and the second geographic region comprises a second population center physically distant from the first population center.

29. The computer-readable medium of claim 27 further comprising fourth program code for assigning a network address to a subscriber station based upon the geographic region of the subscriber station, the network address being within the first range of contiguous network addresses or being within the second range of contiguous network addresses depending upon the geographic region of the subscriber station.

30. The computer-readable medium of claim 27 further comprising fourth program code for assigning a block of network addresses to a base station based upon the geographic region of the base station, the block of network addresses comprising a portion of the first range of contiguous network addresses or a portion of the second range of contiguous network addresses depending upon the geographic region of the base station.

* * * * *